United States Patent
Li

(10) Patent No.: US 12,101,809 B2
(45) Date of Patent: Sep. 24, 2024

(54) TIME SLOT FORMAT INDICATION METHOD, APPARATUS, EQUIPMENT, AND SYSTEM, AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 680 days.

(21) Appl. No.: 17/171,730

(22) Filed: Feb. 9, 2021

(65) Prior Publication Data

US 2021/0168866 A1 Jun. 3, 2021

Related U.S. Application Data

(63) Continuation of application No. PCT/CN2018/100667, filed on Aug. 15, 2018.

(51) Int. Cl.
*H04W 74/0816* (2024.01)
*H04W 72/0446* (2023.01)
(Continued)

(52) U.S. Cl.
CPC ... *H04W 74/0816* (2013.01); *H04W 72/0446* (2013.01); *H04W 72/1273* (2013.01);
(Continued)

(58) Field of Classification Search
CPC ......... H04W 74/0816; H04W 72/0446; H04W 72/1273; H04W 72/23; H04W 74/008;
(Continued)

(56) References Cited

U.S. PATENT DOCUMENTS 10,212,606 B2   2/2019   Gou et al.
2002/0150058 A1 10/2002  Kim et al.
(Continued)

FOREIGN PATENT DOCUMENTS

CN   102484867 A   5/2012
CN   104301273 A   1/2015
(Continued)

OTHER PUBLICATIONS

International Search Report issued in International Application No. PCT/CN2018/100667 mailed Apr. 29, 2019, (with English translation) (6 pages).
(Continued)

*Primary Examiner* — Ashley Shivers
(74) *Attorney, Agent, or Firm* — Oblon, McClelland, Maier & Neustadt, L.L.P.

(57) ABSTRACT

Aspects of the invention relate to the technical field of wireless communication, and provides a time slot format indication method, apparatus, equipment and system, and a storage medium. The method can include transmitting time slot format indication information to User Equipment (UE) upon detecting that a target channel is in an idle state. The time slot format indication information is used for indicating upper and lower row formats of symbols in N time slots within a channel occupation period, the first time slot and/or the last time slot in the N time slots are/is a partial time slot, where N is a positive integer greater than or equal to 1, the channel occupation period refers to a period occupying the target channel by a base station, and the target channel is located on a non-authorized frequency spectrum.

9 Claims, 4 Drawing Sheets

(51) Int. Cl.
    *H04W 72/1273* (2023.01)
    *H04W 72/23* (2023.01)
    *H04W 74/00* (2009.01)
    *H04W 76/27* (2018.01)

(52) U.S. Cl.
    CPC ......... *H04W 72/23* (2023.01); *H04W 74/008* (2013.01); *H04W 76/27* (2018.02)

(58) Field of Classification Search
    CPC . H04W 76/27; H04W 16/14; H04W 74/0808; H04L 5/0091
    See application file for complete search history.

(56) References Cited

U.S. PATENT DOCUMENTS

| | | | |
|---|---|---|---|
| 2016/0119820 | A1 | 4/2016 | Lin et al. |
| 2017/0280331 | A1 | 9/2017 | Gou et al. |
| 2017/0353866 | A1 | 12/2017 | Gou et al. |
| 2018/0110057 | A1 | 4/2018 | Park et al. |
| 2018/0227156 | A1 | 8/2018 | Papasakellariou |
| 2019/0150198 | A1 | 5/2019 | Sun et al. |
| 2019/0200351 | A1 | 6/2019 | Sun et al. |
| 2019/0306857 | A1* | 10/2019 | Lin ................. H04L 5/0007 |
| 2019/0313455 | A1 | 10/2019 | Guey et al. |
| 2019/0349180 | A1* | 11/2019 | Lu ................. H04L 27/2607 |
| 2019/0349904 | A1* | 11/2019 | Kwak ................. H04L 69/324 |
| 2019/0357239 | A1 | 11/2019 | Moon et al. |
| 2020/0037354 | A1 | 1/2020 | Li et al. |
| 2020/0229231 | A1* | 7/2020 | Oh ................. H04W 80/08 |
| 2020/0351923 | A1 | 11/2020 | Karaki et al. |
| 2020/0374933 | A1 | 11/2020 | Lou et al. |
| 2020/0404694 | A1 | 12/2020 | Gao et al. |
| 2021/0195449 | A1* | 6/2021 | Yi ................. H04L 5/0048 |
| 2021/0235491 | A1 | 7/2021 | Iyer et al. |
| 2021/0282133 | A1* | 9/2021 | Parkvall ............ H04W 72/0446 |

FOREIGN PATENT DOCUMENTS

| | | | |
|---|---|---|---|
| CN | 104363975 | A | 2/2015 |
| CN | 105577339 | A | 5/2016 |
| CN | 106160982 | A | 11/2016 |
| CN | 106231614 | A | 12/2016 |
| CN | 106793127 | A | 5/2017 |
| CN | 107079420 | A | 8/2017 |
| CN | 108076515 | A | 5/2018 |
| CN | 109075956 | A | 12/2018 |
| GB | 2575816 | A | 1/2020 |
| JP | 2017-139665 | A | 8/2017 |
| RU | 2232472 | C2 | 7/2004 |
| RU | 2 613 537 | C2 | 3/2017 |
| WO | WO 2015/174748 | A1 | 11/2015 |
| WO | WO 2018/030950 | A1 | 2/2018 |
| WO | WO 2018/086449 | A1 | 5/2018 |
| WO | WO 2018/097586 | A1 | 5/2018 |
| WO | WO 2018114258 | A1 | 6/2018 |
| WO | WO 2018/127229 | A1 | 7/2018 |
| WO | WO 2018/128439 | A1 | 7/2018 |
| WO | WO 2018/144471 | A1 | 8/2018 |
| WO | WO 2018/145019 | A1 | 8/2018 |

OTHER PUBLICATIONS

Written Opinion of the International Searching Authority issued in International Application No. PCT/CN2018/100667 mailed Apr. 29, 2019 (4 pages).
Japanese Office Action issued Mar. 18, 2022 in Japanese Patent Application No. 2021-506958 (with English translation), 7 pages.
Xiaomi, "Discussion on the frame structure for NR-U", 3GPP TSG RAN WG1 Meeting #94 R1-1809220, Internet<URL:http://www.3gpp.org/ftp/tsg_ran/WG1_RL1/TSGR1_94/Docs/R1-1809220.zip>, Aug. 20-24, 2018, 4 pages.
TCL Communication, "Discussion on partial slot transmission in NR-U" 3GPP TSG RAN WG1 Meeting 94 R1-1808254, Internet<URL:http://www.3gpp.org/ftp/tsg_ran/WG1_RL1/TSGR1_94/Docs/R1-1808254.zip>, Aug. 20-24, 2018, 7 pages.
Office Action issued Feb. 26, 2021 in corresponding Chinese Patent Application No. 201880001039.1 (with English Translation), 10 pages.
"Contents of GC PDCCH", Media Tek Inc., 3GPP TSG RAN WG1 Meeting#90, R1-1713679, Aug. 21-25, 2017, pp. 1-4.
Extended European Search Report issued Aug. 17, 2021 in European Patent Application No. 18930058.5, 5 pages.
Decision on Granting issued Aug. 27, 2021 in Russian Patent Application No. 2021106178/07(013381) (with English language translation), 12 pages.
MediaTek Inc., "On frame structure design for NR-U operation," 3GPP TSG RAN WG1 Meeting #94 R1-1808271, Aug. 2018, 4 pages.
TCL Communication, "Discussion on partial slot transmission in NR-U," 3GPP TSG RAN WG1 Meeting 94 R1-1809380, Aug. 2018, 7 pages.
Non-Final Office Action of the U.S. Appl. No. 17/166,836, issued on Oct. 5, 2023, 53 pages.
International Search Report and Written Opinion in the international application No. PCT/CN2018/098639, mailed on Apr. 19, 2019, 6 pages.
First Office Action of the Chinese application No. 201880000951.5, issued on Sep. 3, 2020, 9 pages with English translation.
First Office Action of the Russian application No. 2021105166, issued on Aug. 17, 2021, 15 pages with English translation.
Supplementary European Search Report in the European application No. 18928368.2, mailed on Jul. 14, 2021, 8 pages.
First Office Action of the Japanese application No. 2021-505816, issued on Apr. 4, 2022, 7 pages with English translation.
Office Action of the Indian application No. 202147008802, issued on Jan. 27, 2022, 6 pages with English translation.
First Office Action of the European application No. 18928368.2, mailed on May 4, 2022, 5 pages.
Second Office Action of the European application No. 18928368.2, mailed on Nov. 2, 2022, 6 pages.
Third Office Action of the European application No. 18928368.2, mailed on May 2, 2023, 5 pages.
Notice of Allowance of the Japanese application No. 2021-505816, issued on Oct. 21, 2022, 6 pages with English translation.
Notice of Allowance of the Russian application No. 2021105166, issued on Nov. 16, 2021, 19 pages with English translation.
Huawei, HiSilicon, "NR frame structure on unlicensed bands", 3GPP TSG RAN WG1 Meeting #93 R1-1805917, May 21-May 25, 2018, the whole document, 8 pages.
Reem Karaki et al., "Performance of Autonomous Uplink Transmissions in Unlicensed Spectrum LTE". Dec. 30, 2017. Globecom 2017—2017 IEEE Global Communications Conference, the whole document, 6 pages.
Nokia, Nokia Shanghai Bell, "Frame structure for NR-U operation", 3GPP TSG-RAN WG1 Meeting #93 R1-1806105. May 11, 2018, pp. 1-6, 6 pages.
Lenovo, Motorola Mobility, "Frame structure for NR-U operation", 3GPP TSG-RAN WG1 Meeting #93 R1-1806345, May 11, 2018, pp. 1-3, 3 pages.
Huawei, HiSilicon, "Discussion and TP on slot format for ECP", 3GPP TSG-RAN WG1 Meeting #92bis, R1-1803652 • Apr. 7, 2018, pp. 1-9, 9 pages.
LG Electronics, "Discussion on group common PDCCH", 3GPP TSG-RAN WG1 NR_AH_1801 R1-1800373, Jan. 13, 2018, pp. 1-15, 15 pages.
First Office Action of the Korean application No. 10-2021-7007513, issued on Apr. 22, 2024, 9 pages with English translation.
Ericsson, "On DL signals and channels for NR-U", 3GPP TSG-RAN WG1 Meeting #94, R1-1809202, Göteborg, Sweden, Aug. 20-24, 2018, the whole document, 6 pages.

(56) References Cited

OTHER PUBLICATIONS

Asustek, "Remaining issues on downlink control channel", 3GPP TSG-RAN WG1 Meeting #94, R1-1809246 Gothenburg, Sweden, Aug. 20-24, 2018, the whole document, 11 pages.

\* cited by examiner

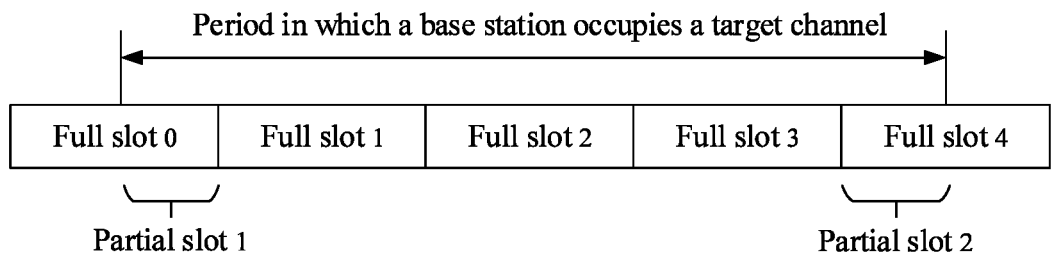
FIG. 1
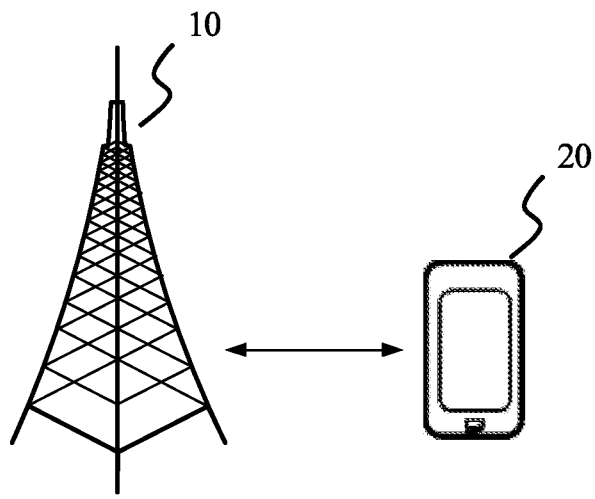
FIG. 2
In response to sensing that a target channel is idle, the base station sends slot format indication information to a UE  — 301
FIG. 3
The UE receives the slot format indication information sent by the base station — 401
FIG. 4

TIME SLOT FORMAT INDICATION METHOD, APPARATUS, EQUIPMENT, AND SYSTEM, AND STORAGE MEDIUM

CROSS REFERENCE TO RELATED APPLICATION

This application is a continuation of International application No. PCT/CN2018/100667, filed on Aug. 15, 2018 and entitled "TIME SLOT FORMAT INDICATION METHOD, APPARATUS, EQUIPMENT, AND SYSTEM, AND STORAGE MEDIUM", the disclosure of which is hereby incorporated by reference in its entirety.

TECHNICAL FIELD

The present disclosure relates to wireless communications, including to a method, apparatus, system, and device for slot format indication and a storage medium.

BACKGROUND

With the development of wireless communication technology, more and more communication systems can transmit communication data through channels in an unlicensed spectrum. Since multiple communication systems can work in the unlicensed spectrum, in consideration of the fairness among multiple communication systems, the communication of a base station in the unlicensed spectrum generally adopts a Listen Before Talk (LBT) mechanism. That is, the base station senses a channel in the unlicensed spectrum before sending communication data, and only when it senses that the channel is idle can it occupy the channel on the unlicensed spectrum to send the communication data.

In practical applications, the moment when the base station starts to occupy the channel in the unlicensed spectrum is likely to be in an intermediate position of a full slot, that is, a partial slot is likely to exist during the time period when the base station occupies the channel in the unlicensed spectrum. The so-called partial slot is a concept relative to the full slot. The number of symbols included in a full slot is 14, while the number of symbols included in the partial slot is less than 14.

SUMMARY

Because the partial slot may bring about adverse effects on normal communication between a base station and a User Equipment (UE), a method for reducing the adverse effects of the partial slot on the normal communication between the base station and the UE can be helpful. Embodiments of the present disclosure provide a method, apparatus, system, and device for slot format indication and a storage medium, which can reduce the adverse effects of a partial slot on normal communication between a base station and a UE.

According a first aspect of the disclosure, a method for slot format indication is provided that can include, in response to sensing that a target channel is idle, sending slot format indication information to a user equipment (UE), the slot format indication information being configured to indicate link formats of symbols in N slots within a channel occupancy period, and at least one of a first slot or a last slot of the N slots being a partial slot, where the N is a positive integer greater than or equal to 1. The channel occupancy period is a period in which a base station occupies the target channel, and the target channel is in an unlicensed spectrum.

According to a second aspect of the disclosure, a method for slot format indication is provided that can include receiving slot format indication information sent by a base station, the slot format indication information being configured to indicate link formats of symbols in N slots within a channel occupancy period, and at least one of the first slot or the last slot in the N slots being a partial slot, where N is a positive integer greater than or equal to 1. The slot format indication information is sent by the base station in response to sensing that a target channel is idle, the channel occupancy period is a period in which the base station occupies the target channel, and the target channel is in an unlicensed spectrum.

According to a third aspect of the disclosure, an apparatus for slot format indication device is provided can include a sending module that is configured to send, in response to sensing that a target channel is idle, slot format indication information to a user equipment (UE), the slot format indication information being configured to indicate link formats of symbols in N slots within a channel occupancy period, and at least one of a first slot or a last slot of the N slots being a partial slot, where the N is a positive integer greater than or equal to 1. The channel occupancy period is a period in which a base station occupies the target channel, and the target channel is in an unlicensed spectrum.

According to a fourth aspect of the disclosure, an apparatus for slot format indication is provided can include a receiving module that is configured to receive slot format indication information sent by a base station, the slot format indication information being configured to indicate link formats of symbols in N slots within a channel occupancy period, and at least one of the first slot or the last slot in the N slots being a partial slot, where N is a positive integer greater than or equal to 1. The slot format indication information is sent by the base station in response to sensing that a target channel is idle, and the channel occupancy period is a period in which the base station occupies the target channel, and the target channel is in an unlicensed spectrum.

According to a fifth aspect of the disclosure, a base station is provided that can include a processor and a memory configured to store an instruction executable for the processor. The processor can be configured to send, in response to sensing that a target channel is idle, slot format indication information to a user equipment (UE), the slot format indication information being configured to indicate link formats of symbols in N slots within a channel occupancy period, and at least one of a first slot or a last slot of the N slots being a partial slot, where the N is a positive integer greater than or equal to 1. The channel occupancy period is a period in which a base station occupies the target channel, and the target channel is in an unlicensed spectrum.

According to a sixth aspect of the disclosure, a UE is provided that can include a processor and a memory configured to store an instruction executable for the processor. The processor is configured to receive slot format indication information sent by a base station, the slot format indication information being configured to indicate link formats of symbols in N slots within a channel occupancy period, and at least one of the first slot or the last slot in the N slots being a partial slot, where N is a positive integer greater than or equal to 1. The slot format indication information is sent by the base station in response to sensing that a target channel is idle, and the channel occupancy period is a period in which the base station occupies the target channel, and the target channel is in an unlicensed spectrum.

According to a seventh aspect of the disclosure, a system for slot format indication is provided, which may include the apparatus for slot format indication in the third aspect and the apparatus for slot format indication in the fourth aspect. Or, the slot format indication system may include the base station in the fifth aspect and the UE in the sixth aspect.

According to an eighth aspect of the disclosure, a non-transitory computer-readable storage medium is provided, in which a computer program is stored. The stored computer program, when executed by a processing component, can implement the method for slot format indication in the first aspect. Or, the stored computer program, when executed by a processing component, can implement the method for slot format indication in the second aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

FIG. 1 is a schematic diagram illustrating slots occupied by a base station in a time period of a channel in an unlicensed spectrum.

FIG. 2 is a schematic diagram illustrating an implementation environment, according to an exemplary embodiment.

FIG. 3 is a flow chart showing a method for slot format indication, according to an exemplary embodiment.

FIG. 4 is a flow chart showing a method for slot format indication, according to an exemplary embodiment.

DETAILED DESCRIPTION

Figure 5:
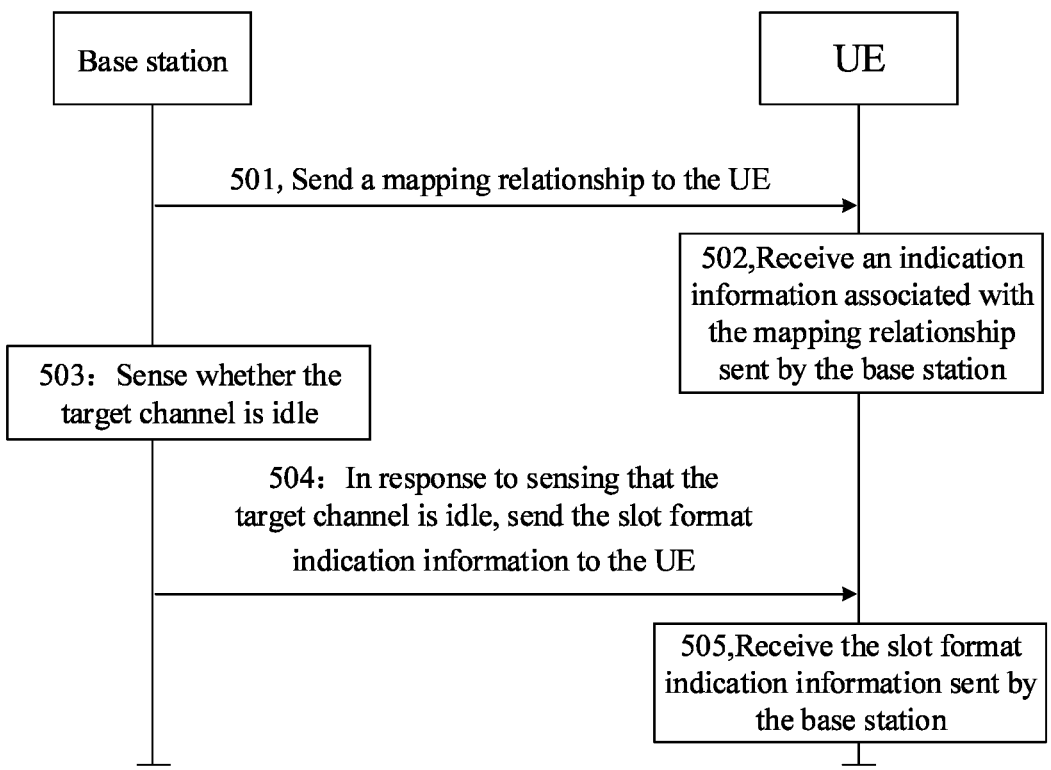
FIG. 5 is a flow chart showing a method for slot format indication, according to an exemplary embodiment.

For making the purposes, technical solutions, and advantages of the present disclosure clearer, implementation modes of the present disclosure will further be described below in combination with the accompanying drawings in detail.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In a Fifth Generation (5G) New Radio Access Technology (NR) communication system, a full slot includes 14 symbols. A full slot format refers to link formats of each symbol included in the full slot.

The link formats of a symbol are used for representing transmission directions of data in the symbol. In the 5G NR communication system, the link formats of the symbol may be divided into three categories, that is, an uplink format (usually denoted by the letter U), a downlink format (usually denoted by the letter D), and a flexible format (usually denoted by the letter X). A symbol with the flexible format can be flexibly used for uplink transmission or downlink transmission, based on further specific configurations in different purposes.

In a symbol of the uplink format, the transmission direction of data is an uplink direction, and a UE may send communication data to a base station in the symbol of the uplink format. In a symbol of the downlink format, the transmission direction of data is a downlink direction, and the UE may receive the communication data sent by the base station in the symbol of the downlink format. In a symbol of flexible format, the UE determines the transmission direction of data in the symbol through a further indication from the base station, that is, the UE determines, through the further indication of the base station, whether it can send the communication data to the base station in the symbol, or the UE determines, through the further indication of the base station, whether it can receive the communication data sent by the base station in the symbol.

At present, the 5G NR communication system defines a table of full slot formats, which include 256 formats. The first 56 full slot formats are specified, and the next 200 formats are reserved for subsequent determination. The 56 full slot formats are shown in Table 1.

TABLE 1

| Slot format number | Symbol number | | | | | | | | | | | | | |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | u |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |

TABLE 1-continued

| Slot format number | Symbol number | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | X | U | U | U | U | U |
| 48 | D | X | U | U | U | U | U | D | X | U | U | U | U | U |
| 49 | D | D | D | X | X | U | U | D | D | D | X | X | U | U |
| 50 | D | D | X | X | U | U | U | D | X | X | U | U | U | U |
| 51 | D | X | X | U | U | U | U | D | X | U | U | U | U | U |
| 52 | D | X | X | X | X | U | U | D | X | X | X | X | U | U |
| 53 | D | D | X | X | X | U | U | D | X | X | X | X | U | U |
| 54 | X | X | X | X | X | X | D | D | D | D | D | D | D | D |
| 55 | D | D | X | X | X | U | U | U | D | D | D | D | D | D |

As shown in Table 1, in the full slot format with slot format number 0, the link format of each symbol is the downlink format; in the full slot format with slot format number 1, the link format of each symbol is the uplink format; in the full slot format with slot format number 3, the link formats of the first 13 symbols are the downlink format, and the link format of the last symbol is the flexible format.

In the 5G NR communication system, the base station may use data with a length of 8 bits to indicate the full slot format to the UE. In this way, the UE may determine the link format of each symbol in the full slot according to an indication of the base station. After determining the link format of each symbol in the full slot, the UE may perform blind detection of a Physical Downlink Control Channel (PDCCH) in the symbol of the downlink format, so as to receive Downlink Control Information (DCI) signaling sent to the UE by the base station through the PDCCH and receive the communication data sent by the base station according to the scheduling of the DCI signaling. Meanwhile, UE may also send the communication data to the base station in the symbol of the uplink format without requesting for permission of the base station.

After determining the link format of each symbol in the full slot, the UE does not need to perform blind detection of the PDCCH in the symbol of the uplink format, nor does the UE need to request for permission of the base station to send the communication data to the base station in the symbol of the uplink format. Therefore, through notifying the UE of the full slot format by the base station, it may reduce the power consumption of the UE on the one hand, and reduces an uplink transmission delay of the UE on the other hand.

In practical applications, the 5G NR communication system may work in an unlicensed spectrum. Under a normal condition, in the communication system working on the unlicensed spectrum, an LBT mechanism is usually adopted for communication of the base station. That is, the base station senses a channel (which is referred to as a target channel in the below) in the unlicensed spectrum at first before transmitting communication data, and occupies the target channel to transmit the communication data when sensing that the target channel is idle. In addition, a duration in which the base station occupies the target channel may not exceed a Maximum Channel Occupancy Time (MCOT), and when the duration in which the target channel is occupied reaches the MCOT, the base station performs LBT again to contend for the channel.

In practical applications, the moment at which the base station starts to occupy the target channel is likely to be in an intermediate position of a full slot, and the moment at which the base station ends occupying the target channel is also likely to be in an intermediate position of a full slot. For example, as shown in FIG. 1, the moment at which the base station starts to occupy the target channel is right in an intermediate position of the full slot 0, and the moment at which the base station ends occupying the target channel is right in an intermediate position of the full slot 4.

Both the moment at which the base station starts to occupy the target channel and the moment at which the base station ends occupying the target channel may be in an intermediate position of a full slot, so a partial slot is likely to exist in a time period in which the base station occupies the target channel. The so-called partial slot is a concept relative to the full slot. In the 5G NR communication system, the number of symbols included in the partial slot is less than 14. For example, as shown in FIG. 1, the moment at which the base station starts to occupy the target channel is right in an intermediate position of the full slot 0, and the moment at which the base station ends occupying the target channel is right in an intermediate position of the full slot 4, so the partial slot 1 and the partial slot 2 exist in the time period in which the base station occupies the target channel.

In the current communication standard, there is no definition of the format of the partial slot or the indication mode of the partial slot being specified. Therefore, when the first slot and/or the last slot of N slots within the channel occupancy period are the partial slots, the UE cannot determine the link formats of symbols in the N slots according to the indication of the base station. Therefore, the UE has to perform blind detection of the PDCCH in each symbol in the N slots. Meanwhile, when there is communication data to be sent to the base station in the N slots, the UE has to request for permission of the base station and send the communication data according to the indication of the base station, which undoubtedly bring about adverse effects on the normal communication between the base station and the UE.

The embodiments of the present disclosure provide a method for slot format indication, which may reduce the adverse effects of the partial slot in the N slots on the normal communication between the base station and the UE.

In the method for slot format indication, the base station may send the slot format indication information to the UE when sensing that the target channel is idle, where the slot format indication information is configured to indicate the link formats of symbols in the N slots within the channel occupancy period, and the first slot and/or the last slot of the N slots is/are a partial slot(s). In this way, the UE may obtain the link formats of the symbols in the N slots according to the indication of the slot format indication information. Therefore, it enables the UE to send communication data to the base station through the symbols of the uplink format in the slots without requesting for permission of the base station, and avoids the UE from blind detection of a Physical Downlink Control Channel (PDCCH) in the symbols of the uplink format in the slots, which may reduce power consumption and uplink transmission delay of the UE, and thus may reduce the adverse effects of the partial slot in N slots on normal communication between the base station and the UE.

An implementation environment involved in a method for slot format indication provided in the embodiments of the present disclosure will be described below.

FIG. 2 is a schematic diagram illustrating an implementation environment involved in a method for slot format indication provided in the embodiments of the present disclosure. As shown in FIG. 2, the implementation environment may include a base station 10 and UE 20. The base station 10 may be connected to the UE 20 through a communication network. The UE 20 is any UE in a cell served by the base station 10. The communication network may be the 5G NR communication network or another communication network similar to the 5G NR communication network.

FIG. 3 is a flow chart showing a method for slot format indication, according to an exemplary embodiment. The method for slot format indication may be applied in a base station 10 shown in FIG. 2. As shown in FIG. 3, the method for slot format indication may include the following steps.

At step S301, in response to sensing that a target channel is idle, the base station sends slot format indication information to the UE. The slot format indication information is configured to indicate link formats of symbols in N slots within a channel occupancy period. The first slot and/or the last slot in the N slots is/are partial slot(s), where the N is a positive integer greater than or equal to 1. The channel occupancy period is a period in which a base station occupies the target channel. The target channel is in an unlicensed spectrum.

To sum up, in the method for slot format indication provided by the embodiments of the present disclosure, when it is sensed that a target channel in an unlicensed spectrum is idle, slot format indication information is sent to a UE, where the slot format indication information is configured to indicate link formats of symbols in N slots within a channel occupancy period, and the first slot and/or the last slot of the N slots is/are a partial slot(s). In this way, the UE may obtain the link formats of the symbols in the N slots according to the indication of the slot format indication information. Therefore, it enables the UE to send communication data to the base station through the symbols of the uplink format in the slots without requesting for permission of the base station, and avoids the UE from blind detection of a Physical Downlink Control Channel (PDCCH) in the symbols of the uplink format in the slots, which may reduce power consumption and uplink transmission delay of the UE, and thus may reduce the adverse effects of the partial slot in N slots on normal communication between the base station and the UE.

FIG. 4 is a flow chart showing a method for slot format indication, according to an exemplary embodiment. The method for slot format indication may be applied in UE 20 shown in FIG. 2. As shown in FIG. 4, the method for slot format indication may include the following steps.

At step S401, the UE receives the slot format indication information sent by the base station. The slot format indication information is configured to indicate link formats of symbols in N slots within a channel occupancy period. The first slot and/or the last slot in the N slots is/are a partial slot(s), where N is a positive integer greater than or equal to 1. The slot format indication information is sent by the base station in response to sensing that the target channel is idle. The channel occupancy period is a period in which the base station occupies the target channel. The target channel is in an unlicensed spectrum.

To sum up, in the method for slot format indication provided by the embodiments of the present disclosure, the slot format indication information which is sent by the base station in response to sensing that the target channel on the unlicensed spectrum is idle is received, where the slot format indication information is configured to indicate the link formats of symbols in the N slots within the channel occupancy period, and the first slot and/or the last slot of the N slots is/are a partial slot(s). In this way, the UE may obtain the link formats of the symbols in the N slots according to the indication of the slot format indication information. Therefore, it enables the UE to send communication data to the base station through the symbols of the uplink format in the slots without requesting for permission of the base station, and avoids the UE from blind detection of a Physical Downlink Control Channel (PDCCH) in the symbols of the uplink format in the slots, which may reduce power consumption and uplink transmission delay of the UE, and thus may reduce the adverse effects of the partial slot in N slots on normal communication between the base station and the UE.

FIG. 5 is a flow chart showing a method for slot format indication, according to an exemplary embodiment. The method for slot format indication may be applied in the implementation environment shown in FIG. 2. As shown in FIG. 5, the method for slot format indication may include the following steps.

At step S501, the base station sends indication information associated with a mapping relationship to the UE. The mapping relationship is a relationship between the slot format indication information and a slot format combination. The slot format combination may include the link formats of symbols in K slots, where the K is a positive integer less than or equal to N.

In this embodiment, each piece of slot format indication information in the mapping relationship corresponds to a respective slot format combination. For example, the slot format indication information 1 corresponds to the slot format combination 1, and the slot format indication information 2 corresponds to the slot format combination 2.

In this embodiment, N and K are involved. N represents the number of slots in the channel occupancy period, as described in S504, and will not be repeated here. K represents the number of slots included in a slot format combination. The number of slots K included in each slot format combination may be the same, in which case K in the mapping relationship is a fixed value; or, the number of slots K included in each slot format combination may be different, in which case K in the mapping relationship is not a fixed value, which and is not limited in this embodiment.

In an embodiment of the present disclosure, the slot format combination includes a plurality of slot format identifiers, e.g., K format identifiers, in a slot format table. A correspondence relationship between the slot format identifiers and link format sequences is stored in the slot format table. Each of the link format sequences includes the link formats of L symbols, where the L is a positive integer less than or equal to 14. The slot format table is described below.

Both the base station and the UE may maintain a slot format table which may be preset by the 5G NR communication system. For example, the slot format table may be specified by the communication standard, or it may also be generated by the base station and sent to the UE.

The correspondence relationship between the format identifiers and the link format sequences is stored in the slot format table. Each format identifier corresponds to a respective link format sequence, and each link format sequence corresponds to a respective set of link formats of symbols in a slot, so each format identifier may represent a respective set of link formats of symbols in a slot.

The above slot may be a full slot or a partial slot. For example, the partial slot may be the partial slot 1 or the partial slot 2 as shown in FIG. 1. As can be seen, the slot format table may further include formats of the partial slot in addition to the 56 formats of the full slot shown in Table 1. In the embodiment, multiple formats of the partial slot may be set, and the slot format identifiers of these formats of the partial slot are identified with numbers 56 to 254. When the numbers 56 to 254 are not enough, the slot format identifiers of the formats of the partial slot may further be identified with numbers after 256. The format identifier of each format of the partial slot corresponds to a number.

The difference between the format of the partial slot and the format of the full slot is that the number of symbols L included in the format of the partial slot is less than 14, while the number of symbols L included in the format of the full slot is equal to 14. Assuming that the number of symbols included in the partial slot is 2 or 3 or 4, then the formats of the partial slot in the slot format table may be shown in Table 2.

TABLE 2

| Format identifier | Link format sequence |
| --- | --- |
| a1 | DDD |
| a2 | DU |
| a3 | DDXU |
| a4 | XUU |
| a5 | DXXU |

As shown in Table 2, the link format sequences in the slot format table may include the link formats of 2 symbols, the link formats of 3 symbols or the link formats of 4 symbols.

Assuming that N slots corresponding to the slot format combination 1 include partial slot 1, full slot 1, full slot 2, full slot 3 and partial slot 2 in turn, and the format identifier of the partial slot 1 is a1, the format identifier of the full slot 1 is 15, the format identifier of the full slot 2 is 4, the format identifier of the full slot 3 is 54, and the format identifier of the partial slot 2 is a3, then the slot format combination 1 is a1, 15, 4, 54 and a3. Assuming that the slot format indication information 1 is ID1, and the slot format combination 1 is a1, 15, 4, 54, and a3, then a mapping relationship is ID1-{a1, 15, 4, 54, a3}.

In an embodiment of the present disclosure, the base station may send the indication information associated with the mapping relationship to the UE through the RRC signaling. That is, the base station may send the RRC signaling, which carries the indication information associated with the mapping relationship, to the UE.

The base station may send the RRC signaling to the UE through either the target channel or another channel different from the target channel, which is not limited by the embodiment.

Before occupying the target channel, the base station senses the target channel, and occupies the target channel only when it senses that the target channel is idle. The target channel being idle means that the target channel is not occupied, and correspondingly, the target channel being in a non-idle state means that the target channel is being occupied.

When an unlicensed spectrum and an licensed spectrum use carrier aggregation or dual connection, the RRC signaling may also be sent in a Primary Cell (PCell) or a Primary Secondary Cell (PScell). When the PCell or the PScell is a cell in the licensed spectrum, channel detection is not required, that is, the RRC signaling is sent directly without sensing whether the channel for sending the RRC signaling is idle. When the PCell or the PScell is a cell in the unlicensed spectrum, channel detection is required, that is, the RRC signaling is sent when it is sensed that the channel for sending the RRC signaling is idle.

At step S502, the UE receives the indication information associated with the mapping relationship sent by the base station. In an embodiment of the present disclosure, the UE may receive the indication information associated with the mapping relationship through the RRC signaling. That is, the UE receives the RRC signaling, which carries the indication information associated with the mapping relationship, sent by the base station.

At step S503, the base station senses whether the target channel is idle. As described above, in the communication system working in the unlicensed spectrum, the base station senses the channel (namely the target channel) in the unlicensed spectrum before sending the communication data, and occupies the target channel to send the communication data only when it senses that the target channel is idle. Therefore, in the embodiments of the present disclosure, the base station executes the technical process of S503.

At step S504, when sensing that the target channel is idle, the base station sends the slot format indication information to the UE. When sensing that the target channel is idle, the base station may occupy the target channel and transmit the communication data through the target channel. In order to reduce the power consumption of the UE and reduce the uplink transmission delay of the UE, that is, in order to reduce the adverse effects of the partial slot in N slots on the normal communication between the base station and the UE, the base station may send the slot format indication information to the UE after occupying the target channel.

In an embodiment of the present disclosure, the base station may send the slot format indication information to the UE through the DCI signaling. That is, when sensing that the target channel is idle, the base station may send the DCI signaling, which carries the slot format indication information, to the UE. The DCI signaling is group common DCI signaling, or UE specific DCI signaling.

The base station may send the DCI signaling to the UE through either the target channel or another channels different from the target channel, which is not limited by the embodiment.

During scheduling across carriers, the DCI signaling may be sent on other cells (that is, other channels), and the other cells may be cells in the unlicensed spectrum or cells in the licensed spectrum. When the other cells are cells in the licensed spectrum, channel detection is not required, that is, the DCI signaling is sent directly without sensing whether the channel for sending the DCI signaling is idle. When the other cells are cells in the unlicensed spectrum, channel detection is required, that is, the DCI signaling is sent when it is sensed that the channel for sending the DCI signaling is idle.

In this embodiment, the base station may sense the target channel before sending the DCI signaling each time. Optionally, when the slot for sending the DCI signaling and the slot for sending the RRC signaling are the same slot, or when the slot for sending the DCI signaling and the slot for sending the RRC signaling are in the same channel occupancy period, the base station may not sense the target channel when sending the DCI signaling, and the target channel is idle by default.

It is to be noted that when the indication information associated with the mapping relationship is carried in the RRC signaling and the slot format indication information is carried in the DCI signaling, due to the long validity period of the RRC signaling, if the base station occupies the target channel for several times in the validity period, then the base station may send new DCI signaling instead of new RRC signaling when occupying the target channel is occupied for the non-first time, so as to save transmission resources. The validity period of the RRC signaling here is usually more than 200 ms.

Optionally, when the base station is to update the mapping relationship, the RRC signaling may be considered invalid, and the base station may send new RRC signaling to occupy the target channel the next time.

The slot format indication information in this embodiment is configured to indicate the link formats of symbols in N slots within the channel occupancy period. The first slot and/or the last slot in the N slots is/are a partial slot(s), where N is a positive integer greater than or equal to 1. The channel occupancy period is a period in which the base station occupies the target channel. The target channel is in the unlicensed spectrum. N can be determined according to the channel occupancy period and a sub-carrier interval. Three calculation manners of N are introduced below.

In the first calculation manner, when the first and last slots in N slots are the partial slots, the base station determines the duration of each slot according to the sub-carrier interval; and adds 1 to the ratio of the duration of the channel occupancy period to the duration of the slot, to obtain the N.

There is a proportional relationship between the sub-carrier interval and the duration of each slot. For example, when the sub-carrier interval is 15 KHz, the duration of each slot is 1 ms, when the sub-carrier interval is 30 KHz, the duration of each slot is 0.5 ms, when the sub-carrier interval is 60 KHz, the duration of each slot is 0.25 ms, and so on. The base station may determine the duration of each slot according to the sub-carrier interval.

The duration of the channel occupancy period may be a maximum duration that the base station can occupy or a duration for the base station to transmit data, which is not limited in this embodiment. For example, the duration of the channel occupancy period may be 10 ms, 8 ms, 2 ms, 3 ms, and so on.

If the duration of the channel occupancy period is 10 ms, and the duration of each slot is assumed to be 1 ms, considering that the channel occupancy period may start from an intermediate position of a certain slot, then 10 ms occupies 2 partial slots and 9 full slots, and at this time, N is equal to 11, if the duration of each slot is assumed to be 0.5 ms, considering that the channel occupancy period may start from an intermediate position of a certain slot, then 10 ms occupies 2 partial slots and 19 full slots, and at this time, N is equal to 21.

In the second calculation manner, when the first slot in N slots is a partial slot, the base station determine the duration of each slot according to the sub-carrier interval; and the ratio the duration of the channel occupancy period to the duration of the slot is determined as N.

The process that the base station determines the duration of each slot according to the sub-carrier interval is described in the first calculation manner, which will not be repeated here.

If the duration of the channel occupancy period is 10 ms, and the duration of each slot is assumed to be 1 ms, considering that the channel occupancy period may start from an intermediate position of a certain slot, and the base station abandons the last partial slot, then 10 ms occupies 1 partial slots and 9 full slots, and at this time, N is equal to 10; if the duration of each slot is assumed to be 0.5 ms, considering that the channel occupancy period may start from an intermediate position of a certain slot, and the base station abandons the last partial slot, then 10 ms occupies 1 partial slots and 19 full slots, and at this time, N is equal to 20.

In the third calculation manner, when the last slot in N slots is a partial slot, the base station determines the duration of each slot according to the sub-carrier interval, and determines the ratio of the duration of the channel occupancy period to the duration of the slot as N.

The process that the base station determines the duration of each slot according to the sub-carrier interval is described in the first calculation manner, which will not be repeated here.

If the duration of the channel occupancy period is 10 ms, and the duration of each slot is assumed to be 1 ms, considering that the channel occupancy period may start from an intermediate position of a certain slot, and the base station abandons the first partial slot, then 10 ms occupies 1 partial slots and 9 full slots, and at this time, N is equal to 10; if the duration of each slot is assumed to be 0.5 ms, considering that the channel occupancy period may start from an intermediate position of a certain slot, and the base station abandons the first partial slot, then 10 ms occupies 1 partial slots and 19 full slots, and at this time, N is equal to 20.

After obtaining N, the base station indicates the link formats of symbols in N slots through the slot format indication information. If different UEs sense the slot format indication information in different slots, then the slot format indication information is to be sent in each slot. If the UEs are limited such that different UEs sense the slot format indication information in a specific slot, then it is possible to send the slot format indication information in the specific slot. The two implementation modes are described below.

In the first implementation mode, the base station sends the slot format indication information in each slot.

It is to be noted that no matter in which slot the slot format indication information is sent, the slot format indication information indicates the link formats of the symbols in that slot and in the slots following that slot of N slots. That is, the slot format indication information includes N pieces of first slot format indication information. The i-th piece of first slot format indication information is configured to indicate the link formats of symbols in the slots i to N of the N slots, where i is a positive integer less than or equal to the N.

Assuming that the N is equal to 5, when the base station sends the first slot format indication information in the first slot, the first slot format indication information indicates the link formats of symbols in five slots; when the base station sends the second slot format indication information in the second slot, the second slot format indication information indicates the link formats of symbols in the last four slots; when the base station sends the third slot format indication information in the third slot, the third slot format indication information indicates the link formats of symbols in the last three slots, and so on, when the base station sends the fifth slot format indication information in the fifth slot, the fifth slot format indication information indicates the link formats of symbols in the last slot.

The i-th piece of first slot format indication may be of the following two types, which are described below respectively.

1) The i-th piece of first slot format indication information is configured to indicate a first slot format combination, and the first slot format combination includes the link formats of symbols in N−i+1 slots. In the implementation mode, each of N slots corresponds to a respective piece of first slot format indication information, and the first slot format combination indicated by each piece of first slot format indication information is different from one another. The link formats of symbols in N−i+1 slots included in the first slot format combination indicated by the i-th piece of first slot format indication information are the same as those of symbols in the last N−i+1 slots included in the first slot format combination indicated by the first piece of first slot format indication information.

It is still assumed that the N is 5, the first slot format combination indicated by the first piece of first slot format indication information includes the link formats of symbols in five slots, for example, the first slot format combination indicated by the first piece of first slot format indication information ID1 is {a1, 15, 4, 54, a3}; the first slot format combination indicated by the second piece of first slot format indication information includes the link formats of symbols in four slots, and the link formats of symbols in the four slots are the same as that of symbols in the last four of the five slots, for example, the first slot format combination indicated by the second piece of first slot format indication information ID2 is {15, 4, 54, a3}; the first slot format combination indicated by the third piece of first slot format indication information includes the link formats of symbols in three slots, and the link formats of symbols in the three slots are the same as that of symbols in the last three of the five slots, for example, the first slot format combination indicated by the third piece of first slot format indication information ID3 is {4, 54, a3}, and so on.

2) The i-th piece of first slot format indication information includes first slot format indication sub-information and slot number indication information; the first slot format indication sub-information is configured to indicate a second slot format combination; the second slot format combination includes the link formats of symbols in the N slots; and the slot number indication information is configured to indicate that the link formats of symbols in the slots i to N of the N slots are the same as those of symbols in the last N−i+1 slots in the second slot format combination.

In this implementation mode, in each piece of first slot format indication information, the first slot format indication sub-information is the same, while the slot number indication information is different. The first slot format indication sub-information referred to here is the first piece of first slot format indication information in the previous implementation mode.

It is still assumed that N is 5, then the first piece of first slot format indication information includes the first slot format indication sub-information and the slot number indication information 5, so as to indicate that the link formats of symbols in the slots 1 to 5 are the same as those of symbols in the five slots included in the second slot format combination, for example, the first piece of first slot format indication information ID1 indicates {a1, 15, 4, 54, a3}, the second piece of first slot format indication information includes the first slot format indication sub-information and the slot number indication information 4, so as to indicate that the link formats of symbols in the slots 2 to 5 are the same as those of symbols in the last four of the five slots included in the second slot format combination, for example, the second piece of first slot format indication information ID2 indicates {15, 4, 54, a3} in {a1, 15, 4, 54, a3}, the third piece of first slot format indication information includes the first slot format indication sub-information and the slot number indication information 3, so as to indicate that the link formats of symbols in the slots 3 to 5 are the same as those of symbols in the last three of the five slots included in the second slot format combination, for example, the third piece of first slot format indication information ID3 indicates {4, 54, a3} in {a1, 15, 4, 54, a3}, and so on.

In the second implementation mode, the base station sends the slot format indication information in a specific slot. The specific slot here may be defined as any slot within the period. For example, the specific slot is the first slot in a slot combination with a period of 3. If N slots are slots 0 to 11 respectively, then the specific slots are slots 0, 3, 6, and 9 respectively.

Since the UE receives the slot format indication information in the specific slot, the link formats of symbols in each slot within a period may be indicated through a piece of slot format indication information. In this case, the slot format indication information includes M pieces of second slot format indication information. The j-th piece of second slot format indication information is configured to indicate the link formats of symbols in P slots in the j-th period, where the j is a positive integer less than or equal to the M, and a product M and P is less than or equal to N.

In an embodiment of the present disclosure, the second slot format indication information is configured to indicate a third slot format combination, which includes the link formats of symbols in P slots.

In this implementation mode, all slots within each period correspond to a piece of second slot format indication information, and the third slot format combination indicated by each second piece of first slot format indication information may be the same or different.

Assuming that N is 11 and the specific slot is the first slot in the slot combination with a period of 3, the first piece of second slot format indication information ID1 sent in the slot 0 indicates a third slot format combination, the second piece of second slot format indication information ID2 sent in the slot 3 indicates a third slot format combination, the third piece of second slot format indication information ID3 sent in the slot 6 indicates a third slot format combination, and the fourth piece of second slot format indication information ID4 sent in the slot 9 indicates a third slot format combination.

In this embodiment, the base station may also set a preset threshold, and the size of the preset threshold is not limited in this embodiment.

When N is less than the preset threshold, the base station may generate a piece of slot format indication information for the channel occupancy period, which may be implemented by referring to the implementation mode described above.

When N is greater than the preset threshold, the base station divides the channel occupancy period into several segmented periods, and generates a piece of slot format indication information for each segmented period, in which case the slot format indication information includes at least two pieces of third slot format indication information. The third slot format indication information is configured to indicate the link formats of symbols in Q slots within a segmented period of the channel occupancy period, where Q is a positive integer less than or equal to the preset threshold.

In this implementation mode, the base station may generate a piece of slot format indication information for each segmented period. If each segmented period is regarded as a channel occupancy period, then its implementation mode may refer to the implementation mode described above.

At step S505, the UE receives the slot format indication information sent by the base station. In an embodiment of the present disclosure, the UE may receive the slot format indication information through the DCI signaling. That is, the UE receives the DCI signaling sent by the base station, and the DCI signaling carries the slot format indication information.

To sum up, in the method for slot format indication provided by the embodiments of the present disclosure, when it is sensed that a target channel in an unlicensed spectrum is idle, slot format indication information is sent to a UE, where the slot format indication information is configured to indicate link formats of symbols in N slots within a channel occupancy period, and the first slot and/or the last slot of the N slots is/are a partial slot(s). In this way, the UE may obtain the link formats of the symbols in the N slots according to the indication of the slot format indication information. Therefore, it enables the UE to send communication data to the base station through the symbols of the uplink format in the slots without requesting for permission of the base station, and avoids the UE from blind detection of a Physical Downlink Control Channel (PDCCH) in the symbols of the uplink format in the slots, which may reduce power consumption and uplink transmission delay of the UE, and thus may reduce the adverse effects of the partial slot in N slots on normal communication between the base station and the UE.

Figure 6:
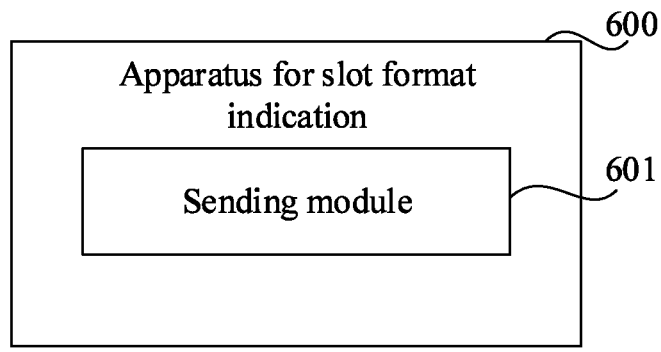
FIG. 6 is a block diagram of an apparatus for slot format indication, according to an exemplary embodiment.

FIG. 6 is a block diagram of an apparatus 600 for slot format indication, according to an exemplary embodiment. The apparatus 600 for slot format indication may be arranged in the base station 10 shown in FIG. 2. Referring to FIG. 6, the apparatus 600 for slot format indication includes a sending module 601. Of course, it should be understood that one or more of the modules described in this disclosure can be implemented by hardware, such as circuitry.

The sending module 601 is configured to send, in response to sensing that the target channel is idle, the slot format indication information to the UE. The slot format indication information is configured to indicate link formats of symbols in N slots within a channel occupancy period. The first slot and/or the last slot in the N slots is/are a partial slot(s), where the N is a positive integer greater than or equal to 1. The channel occupancy period is a period in which a base station occupies the target channel. The target channel is in an unlicensed spectrum.

In an embodiment of the present disclosure, the sending module 601 is further configured to send indication information associated with a mapping relationship to the UE. The mapping relationship is a relationship between the slot format indication information and the slot format combination. The slot format combination may include the link formats of symbols in K slots, where K is a positive integer less than or equal to N.

In an embodiment of the present disclosure, the slot format combination includes a plurality of slot format identifiers, for example K format identifiers, in a slot format table. A correspondence relationship between slot format identifiers and link format sequences is stored in the slot format table. Each of the link format sequences includes the link formats of L symbols, where L is a positive integer less than or equal to 14.

In an embodiment of the present disclosure, the sending module 601 is further configured to send the RRC signaling, which carries the indication information associated with the mapping relationship, to the UE.

In an embodiment of the present disclosure, N is determined according to the channel occupancy period and the sub-carrier interval.

In an embodiment of the present disclosure, the first and last slots in N slots are the partial slots. The device further includes: a determining module and a calculating module.

The determining module is configured to determine the duration of each slot according to the sub-carrier interval.

The calculating module is configured to add 1 to a ratio of the duration of the channel occupancy period to the duration of the slot to obtain the N.

In an embodiment of the present disclosure, the slot format indication information includes N pieces of first slot format indication information. The i-th piece of first slot format indication information is configured to indicate the link formats of symbols in the slots i to N of the N slots, where the i is a positive integer less than or equal to the N.

In an embodiment of the present disclosure, the i-th piece of first slot format indication information is configured to indicate the first slot format combination, which includes the link formats of symbols in N−i+1 slots.

In an embodiment of the present disclosure, the i-th piece of first slot format indication information includes the first slot format indication sub-information and the slot number indication information; the first slot format indication sub-information is configured to indicate the second slot format combination, the second slot format combination includes the link formats of symbols in the N slots, and the slot number indication information is configured to indicate that the link formats of symbols in the slots i to N of the N slots are the same as those of symbols in the last N−i+1 slots in the second slot format combination.

In an embodiment of the present disclosure, the slot format indication information includes M pieces of second slot format indication information. The j-th piece of second slot format indication information is configured to indicate the link formats of symbols in P slots in the j-th period, where j is a positive integer less than or equal to the M, and a product of M and P is less than or equal to N.

In an embodiment of the present disclosure, the second slot format indication information is configured to indicate the third slot format combination, which includes the link formats of symbols in P slots.

In an embodiment of the present disclosure, N is greater than the preset threshold. The slot format indication information includes at least two pieces of third slot format indication information; the third slot format indication information is configured to indicate the link formats of symbols in Q slots within a segment of the channel occupancy period, where Q is a positive integer less than or equal to the preset threshold.

In an embodiment of the present disclosure, the sending module 601 is further configured to send the DCI signaling, which carries the slot format indication information, to the UE.

In an embodiment of the present disclosure, the DCI signaling is the group common DCI signaling, or the DCI signaling is the UE specific DCI signaling.

To sum up, with the slot format indication device provided by the embodiments of the present disclosure, when it is sensed that a target channel in an unlicensed spectrum is idle, slot format indication information is sent to a UE, where the slot format indication information is configured to indicate link formats of symbols in N slots within a channel occupancy period, and the first slot and/or the last slot of the N slots is/are a partial slot(s). In this way, the UE may obtain the link formats of the symbols in the N slots according to the indication of the slot format indication information. Therefore, it enables the UE to send communication data to the base station through the symbols of the uplink format in the slots without requesting for permission of the base station, and avoids the UE from blind detection of a Physical Downlink Control Channel (PDCCH) in the symbols of the uplink format in the slots, which may reduce power consumption and uplink transmission delay of the UE, and thus may reduce the adverse effects of the partial slot in N slots on normal communication between the base station and the UE.

With respect to the apparatus in the above embodiment, the specific manners for performing operations for individual modules therein have been described in detail in the embodiment regarding the method, which will not be elaborated herein.

Figure 7:
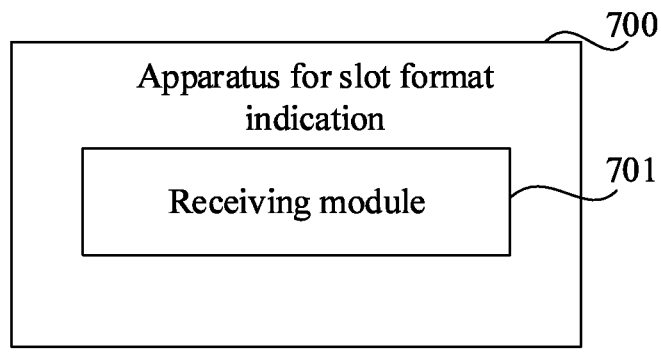
FIG. 7 is a block diagram of an apparatus for slot format indication, according to an exemplary embodiment.

FIG. 7 is a block diagram of an apparatus 700 for slot format indication, according to an exemplary embodiment. The apparatus 700 for slot format indication may be arranged in the UE 20 shown in FIG. 2. Referring to FIG. 7, the apparatus 700 for slot format indication includes a receiving module 701.

The receiving module 701 is configured to receive the slot format indication information sent by the base station. The slot format indication information is configured to indicate link formats of symbols in N slots within a channel occupancy period. The first slot and/or the last slot in the N slots is/are a partial slot(s), where N is a positive integer greater than or equal to 1. The slot format indication information is sent by the base station in response to sensing that the target channel is idle. The channel occupancy period is a period in which the base station occupies the target channel. The target channel is in an unlicensed spectrum.

In an embodiment of the present disclosure, the receiving module 701 is further configured to receive indication information associated with a mapping relationship sent by the base station. The mapping relationship is a relationship between the slot format indication information and the slot format combination. The slot format combination may include the link formats of symbols in K slots, where K is a positive integer less than or equal to N.

In an embodiment of the present disclosure, the slot format combination includes a plurality of slot format identifiers, e.g., K format identifiers, in a slot format table. A correspondence relationship between slot format identifiers and link format sequences is stored in the slot format table. Each of the link format sequences includes the link formats of L symbols, where the L is a positive integer less than or equal to 14.

In an embodiment of the present disclosure, the sending module 601 is further configured to receive the RRC signaling, which carries the indication information associated with the mapping relationship, sent by the base station.

In an embodiment of the present disclosure, N is determined according to the channel occupancy period and the sub-carrier interval.

In an embodiment of the present disclosure, the slot format indication information includes N pieces of first slot format indication information. The i-th piece of first slot format indication information is configured to indicate the link formats of symbols in the slots i to N of the N slots, where the i is a positive integer less than or equal to the N.

In an embodiment of the present disclosure, the i-th piece of first slot format indication information is configured to indicate the first slot format combination, which includes the link formats of symbols in N−i+1 slots.

In an embodiment of the present disclosure, the i-th piece of first slot format indication information includes the first slot format indication sub-information and the slot number indication information; the first slot format indication sub-information is configured to indicate the second slot format combination; the second slot format combination includes the link formats of symbols in the N slots; and the slot number indication information is configured to indicate that the link formats of symbols in the slots i to N of the N slots are the same as those of symbols in the last N−i+1 slots in the second slot format combination.

In an embodiment of the present disclosure, the slot format indication information includes M pieces of second slot format indication information. The j-th piece of second slot format indication information is configured to indicate the link formats of symbols in P slots in the j-th period, where the j is a positive integer less than or equal to the M, and a product of M and P is less than or equal to the N.

In an embodiment of the present disclosure, the second slot format indication information is used to indicate the third slot format combination, which includes the link formats of symbols in P slots.

In an embodiment of the present disclosure, N is greater than the preset threshold. The slot format indication information includes at least two pieces of third slot format indication information; the third slot format indication information is configured to indicate the link formats of symbols in Q slots within a segment of the channel occupancy period, where the Q is a positive integer less than or equal to the preset threshold.

In an embodiment of the present disclosure, the receiving module 701 is further configured to receive the DCI signaling, which carries the slot format indication information, sent by the base station.

In an embodiment of the present disclosure, the DCI signaling is the group common DCI signaling, or the DCI signaling is the UE specific DCI signaling.

To sum up, with the apparatus for slot format indication provided by the embodiments of the present disclosure, the slot format indication information which is sent by the base station in response to sensing that the target channel on the unlicensed spectrum is idle is received, where the slot format indication information is configured to indicate the link formats of symbols in the N slots within the channel occupancy period, and the first slot and/or the last slot of the N slots is/are a partial slot(s). In this way, the UE may obtain the link formats of the symbols in the N slots according to the indication of the slot format indication information. Therefore, it enables the UE to send communication data to the base station through the symbols of the uplink format in the slots without requesting for permission of the base station, and avoids the UE from blind detection of a Physical Downlink Control Channel (PDCCH) in the symbols of the uplink format in the slots, which may reduce power consumption and uplink transmission delay of the UE, and thus may reduce the adverse effects of the partial slot in N slots on normal communication between the base station and the UE.

With respect to the apparatus in the above embodiment, the specific manners for performing operations for individual modules therein have been described in detail in the embodiment regarding the method, which will not be elaborated herein.

Figure 8:
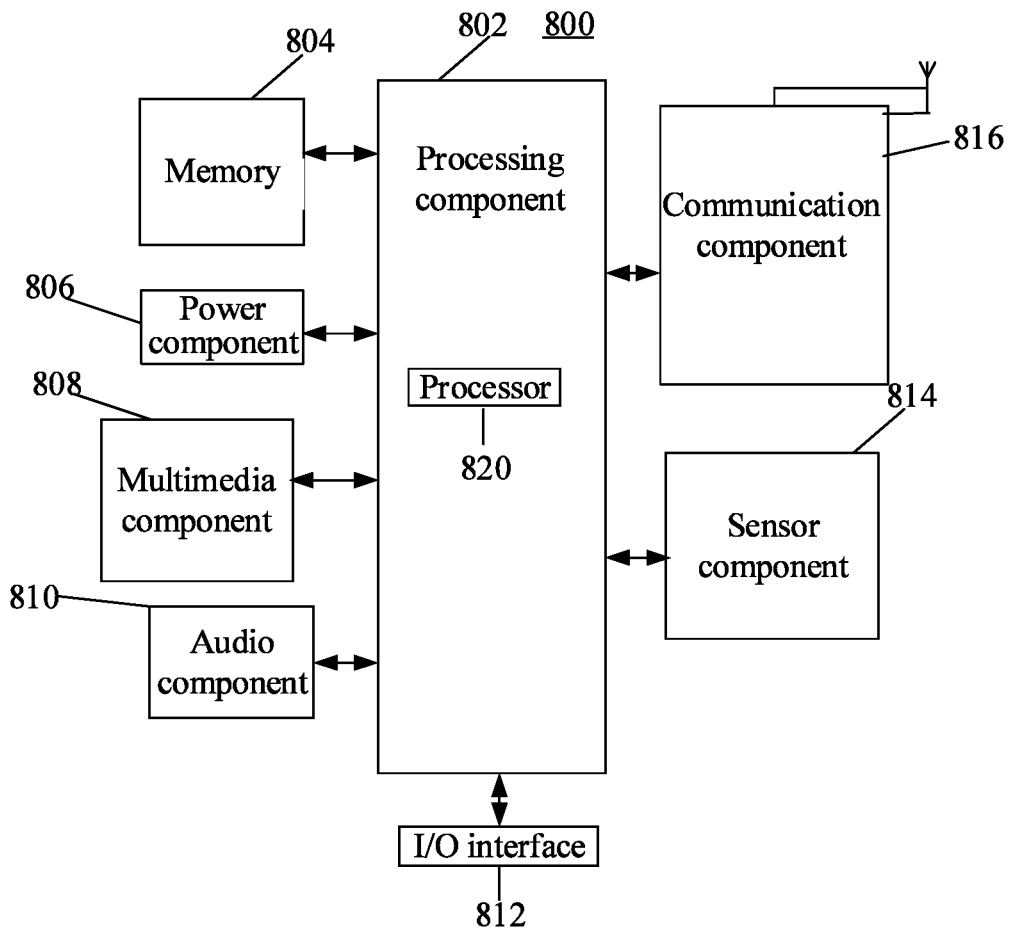
FIG. 8 is a block diagram of an apparatus for slot format indication, according to an exemplary embodiment.

FIG. 8 is a block diagram of a device 800 for slot format indication, according to an exemplary embodiment. For example, the device 800 may be a mobile phone, a computer, a digital broadcast terminal, a messaging device, a gaming console, a tablet, a medical device, exercise equipment, and a personal digital assistant.

Referring to FIG. 8, the device 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps executed by the UE 20 in the above method embodiment. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the device 800. Examples of such data include instructions for any application programs or methods operated on the device 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen providing an output interface between the device 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 includes one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the device 800 and another device. The device 800 may access any communication-standard-based wireless network, such as a Wi-Fi network, a 2nd-Generation (2G) or 3rd-Generation (3G) network or a combination thereof. In an exemplary embodiment, the communication component 816 receives a broadcast signal or broadcast associated information from an external broadcast management system through a broadcast channel. In an exemplary embodiment, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology, and another technology.

In an exemplary embodiment, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the technical process performed by the UE 20 in the above method embodiment.

In an exemplary embodiment, there is also provided a non-transitory computer-readable storage medium including an instruction, such as the memory 804 including an instruction, and the instruction may be executed by the processor 820 of the device 800 to complete the technical process performed by the UE 20 in the above method embodiment. For example, the non-transitory computer-readable storage medium may be a ROM, a Random Access Memory (RAM), a Compact Disc Read-Only Memory (CD-ROM), a magnetic tape, a floppy disc, an optical data storage device, and the like.

Figure 9:
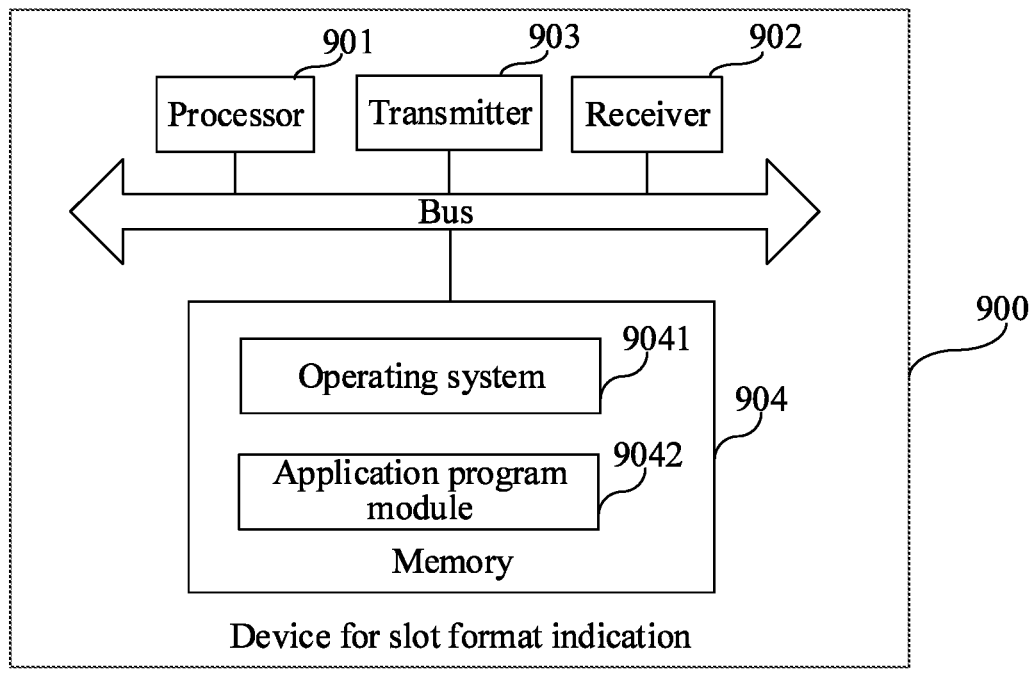
FIG. 9 is a block diagram of an apparatus for slot format indication, according to an exemplary embodiment.

FIG. 9 is a block diagram of a device 900 for slot format indication, according to an exemplary embodiment. For example, the slot format indication device 900 may be a base station. As shown in FIG. 9, the slot format indication device 900 may include a processor 901, a receiver 902, a transmitter 903 and a memory 904. The receiver 902, the transmitter 903 and the memory 904 are connected with the processor 901 through a bus respectively.

The processor 901 includes one or more than one processing core, and the processor 901 runs a software program and a module to execute the method executed by the base station in the methods for slot format indication provided in the embodiments of the present disclosure. The memory 904 may be configured to store the software program and the module. Specifically, the memory 904 may store an operating system 9041 and an application program module 9042 required by at least one function. The receiver 902 is configured to receive communication data sent by another device, and the transmitter 903 is configured to send communication data to the other device.

Figure 10:
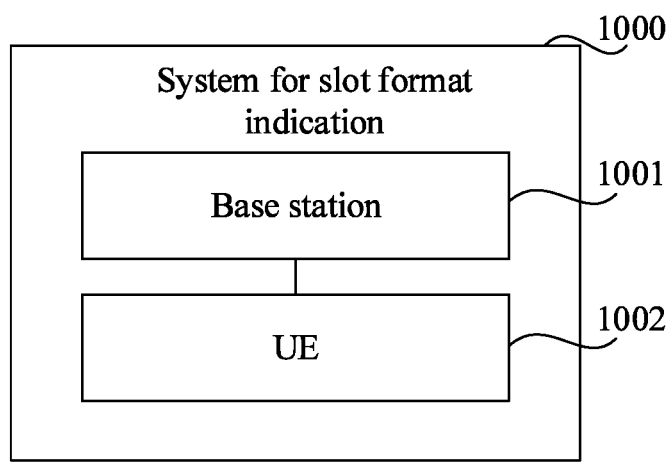
FIG. 10 is a block diagram of a system for slot format indication, according to an exemplary embodiment.

FIG. 10 is a block diagram of a system 1000 for slot format indication, according to an exemplary embodiment. As shown in FIG. 10, the system 1000 for slot format indication may include a base station 1001 and UE 1002.

The base station 1001 is configured to execute the method for slot format indication executed by a base station in the embodiment shown in FIG. 5. The UE 1002 is configured to execute the method for slot format indication executed by UE in the embodiment shown in FIG. 5.

In an exemplary embodiment, there is also provided a non-transitory computer-readable storage medium. The computer-readable storage medium is a non-volatile computer-readable storage medium. A computer program is stored in the computer-readable storage medium. The stored computer program is executed by a processing component to implement the methods for slot format indication provided in the abovementioned embodiments of the present disclosure.

The embodiments of the present disclosure also provide a computer program product, in which an instruction is stored. When the instruction runs in a computer, the computer may execute the methods for slot format indication provided in the embodiments of the present disclosure.

The embodiments of the present disclosure also provide a chip, which includes a programmable logic circuit and/or a program instruction and may run to execute the methods for slot format indication provided in the embodiments of the present disclosure.

According to an aspect, a method for slot format indication is provided, the method can include, in response to sensing that a target channel is idle, sending slot format indication information to a user equipment (UE), the slot format indication information being configured to indicate link formats of symbols in N slots within a channel occupancy period, and at least one of a first slot or a last slot of the N slots being a partial slot, where N is a positive integer greater than or equal to 1. The channel occupancy period is a period in which a base station occupies the target channel, and the target channel is in an unlicensed spectrum.

In some embodiments, the method may further include: sending indication information associated with a mapping relationship to the UE, the mapping relationship being a relationship between the slot format indication information and a slot format combination.

In some embodiments, the slot format combination may include a plurality of slot format identifiers in a slot format table, a correspondence relationship between the slot format identifiers and link format sequences is stored in the slot format table, and each of the link format sequences may include link formats of L symbols, where L is a positive integer less than or equal to 14.

In some embodiments, the operation of sending the indication information associated with the mapping relationship to the UE may include: sending radio resource control (RRC) signaling to the UE, wherein the RRC signaling carries the indication information associated with the mapping relationship.

In some embodiments, N is determined according to the channel occupancy period and a sub-carrier interval.

In some embodiments, each of the first slot and the last slot of the N slots is a partial slot, and the method may further include determining a duration of each of the slots according to the sub-carrier interval, and adding 1 to a ratio of a duration of the channel occupancy period to the duration of the slot, to obtain a value of N.

In some embodiments, the slot format indication information includes N pieces of first slot format indication information. An i-th piece of the N pieces of first slot format indication information is configured to indicate link formats of symbols in slots i to N of the N slots, where i is a positive integer less than or equal to N.

In some embodiments, the i-th piece of first slot format indication information may be configured to indicate a first slot format combination, and the first slot format combination may include link formats of symbols in N−i+1 slots.

In some embodiments, the i-th piece of first slot format indication information may include first slot format indication sub-information and slot number indication information; the first slot format indication sub-information is configured to indicate a second slot format combination, the second slot format combination may include the link formats of symbols in the N slots, and the slot number indication information is configured to indicate that the link formats of symbols in the slots i to N of the N slots are the same as those of symbols in last N−i+1 slots in the second slot format combination.

In some embodiments, the slot format indication information may include M pieces of second slot format indication information, wherein a j-th piece of the M pieces of second slot format indication information is configured to indicate link formats of symbols in P slots in a j-th period, where j is a positive integer less than or equal to M, and a product of M and P is less than or equal to N.

In some embodiments, the second slot format indication information may be configured to indicate a third slot format combination, and the third slot format combination may include the link formats of symbols in P slots.

In some embodiments, N is greater than a preset threshold; and the slot format indication information may include at least two pieces of third slot format indication information; the third slot format indication information is configured to indicate link formats of symbols in Q slots within a segment of the channel occupancy period, where Q is a positive integer less than or equal to the preset threshold.

In some embodiments, the operation of sending the slot format indication information to the UE may include: sending downlink control information (DCI) signaling to the UE, wherein the DCI signaling carries the slot format indication information. Further, in some embodiments, the DCI signaling is group common DCI signaling, or the DCI signaling is UE specific DCI signaling.

According to an aspect, a method for slot format indication is provided, the method can include receiving slot format indication information sent by a base station, the slot format indication information being configured to indicate link formats of symbols in N slots within a channel occupancy period, and at least one of the first slot or the last slot in the N slots being a partial slot, where N is a positive integer greater than or equal to 1. The slot format indication information is sent by the base station in response to sensing that a target channel is idle, the channel occupancy period is a period in which the base station occupies the target channel, and the target channel is in an unlicensed spectrum.

In some embodiments, the method may further include receiving an indication information associated with a mapping relationship sent by the base station, the mapping relationship being a relationship between the slot format indication information and a slot format combination.

In some embodiments, the slot format combination may include a plurality of slot format identifiers in a slot format table, a correspondence relationship between slot format identifiers and link format sequences is stored in the slot format table, and each of the link format sequences may include link formats of L symbols, where L is a positive integer less than or equal to 14.

In some embodiments, the operation of receiving the indication information associated with the mapping relationship sent by the base station may include: receiving radio resource control (RRC) signaling sent by the base station, wherein the RRC signaling carries the indication information associated with the mapping relationship.

In some embodiments, N is determined according to the channel occupancy period and a sub-carrier interval.

In some embodiments, the slot format indication information may include N pieces of first slot format indication information, wherein an i-th piece of first slot format indication information is configured to indicate link formats of symbols in slots i to N of the N slots, where i is a positive integer less than or equal to N.

In some embodiments, the i-th piece of first slot format indication information may be configured to indicate a first slot format combination, and the first slot format combination may include link formats of symbols in N−i+1 slots.

In some embodiments, the i-th piece of first slot format indication information may include first slot format indication sub-information and slot number indication information; the first slot format indication sub-information is configured to indicate a second slot format combination, the second slot format combination may include the link formats of symbols in the N slots, and the slot number indication information is configured to indicate that the link formats of symbols in the slots i to N of the N slots are the same as that of symbols in the last N−i+1 slots in the second slot format combination.

In some embodiments, the slot format indication information may include M pieces of second slot format indication information, wherein a j-th piece of the M pieces of second slot format indication information is configured to indicate link formats of symbols in P slots in a j-th period, where the j is a positive integer less than or equal to the M, and a product of M and P is less than or equal to N.

In some embodiments, the second slot format indication information may be configured to indicate a third slot format combination, and the third slot format combination may include the link formats of symbols in P slots.

In some embodiments, N is greater than a preset threshold, and the slot format indication information may include at least two pieces of third slot format indication information; the third slot format indication information is configured to indicate link formats of symbols in Q slots within a segment of the channel occupancy period, where Q is a positive integer less than or equal to the preset threshold.

In some embodiments, the operation of receiving the slot format indication information sent by the base station may include: receiving downlink control information (DCI) signaling sent by the base station, wherein the DCI signaling carries the slot format indication information. In some embodiments, the DCI signaling is group common DCI signaling, or the DCI signaling is UE specific DCI signaling.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for slot format indication, comprising:
    sending slot format indication information to a user equipment (UE) when determining that a target channel is idle, the slot format indication information being configured to indicate uplink and downlink formats of symbols in N slots within a channel occupancy period, and a last slot of the N slots being a partial slot, where N is a positive integer greater than or equal to 1, and N is determined based on the channel occupancy period and a sub-carrier interval;
    wherein the channel occupancy period is a period in which a base station occupies the target channel that is in an unlicensed spectrum; and
    sending a mapping relationship to the UE, the mapping relationship being a relationship between the slot format indication information and a slot format combination; wherein the slot format combination comprises uplink and downlink formats of symbols in K slots, where K is a positive integer less than or equal to N;
    wherein the slot format combination further comprises K format identifiers in a slot format table, a correspondence relationship between at least one group of format identifiers and uplink and downlink format sequences is stored in the slot format table, and each of the uplink and downlink format sequences comprises uplink and downlink formats of L symbols, where L is a positive integer less than or equal to 14.

2. The method of claim 1, wherein:
    N is greater than a preset threshold, and
    the slot format indication information includes at least two pieces of third slot format indication information that is configured to indicate uplink and downlink formats of symbols in Q slots within a segment of the channel occupancy period, where Q is a positive integer less than or equal to the preset threshold.

3. The method of claim 1, wherein sending the slot format indication information to the UE further comprises:
    sending downlink control information (DCI) signaling to the UE, wherein the DCI signaling carries the slot format indication information.

4. The method of claim 3, wherein the DCI signaling is:
    group common DCI signaling, or
    UE specific DCI signaling.

5. A method for slot format indication, comprising:
    receiving slot format indication information sent by a base station, the slot format indication information being configured to indicate uplink and downlink formats of symbols in N slots within a channel occupancy period, and a last slot in the N slots being a partial slot, where N is a positive integer greater than or equal to 1, and N is determined based on the channel occupancy period and a sub-carrier interval;
    wherein the slot format indication information is sent by the base station when a target channel is idle, the channel occupancy period is a period in which the base station occupies the target channel that is in an unlicensed spectrum; and
    receiving a mapping relationship sent by the base station, the mapping relationship being a relationship between the slot format indication information and a slot format combination; wherein the slot format combination comprises uplink and downlink formats of symbols in K slots, where K is a positive integer less than or equal to N;
    wherein the slot format combination further comprises K format identifiers in a slot format table, a correspondence relationship between at least one group of format identifiers and uplink and downlink format sequences is stored in the slot format table, and each of the uplink and downlink format sequences comprises uplink and downlink formats of L symbols, where L is a positive integer less than or equal to 14.

6. The method of claim 5, wherein receiving the slot format indication information sent by the base station further comprises:
    receiving downlink control information (DCI) signaling sent by the base station, wherein the DCI signaling carries the slot format indication information.

7. The method of claim 6, wherein the DCI signaling is:
    group common DCI signaling, or
    UE specific DCI signaling.

8. A base station, comprising:
    a processor; and
    a memory that is configured to store an instruction executable for the processor,
    wherein the processor is configured to perform the method of claim 1.

9. A User Equipment (UE), comprising:
    a processor; and
    a memory that is configured to store an instruction executable for the processor,
    wherein the processor is configured to:
    receive slot format indication information sent by a base station, the slot format indication information being configured to indicate uplink and downlink formats of symbols in N slots within a channel occupancy period, and a last slot in the N slots being a partial slot, where N is a positive integer greater than or equal to 1, and N is determined based on the channel occupancy period and a sub-carrier interval;
    wherein the slot format indication information is sent by the base station when a target channel is idle, and the channel occupancy period is a period in which the base station occupies the target channel that is in an unlicensed spectrum; and
    receive a mapping relationship sent by the base station, the mapping relationship being a relationship between the slot format indication information and a slot format combination; wherein the slot format combination comprises uplink and downlink formats of symbols in K slots, where K is a positive integer less than or equal to N;
    wherein the slot format combination further comprises K format identifiers in a slot format table, a correspondence relationship between at least one group of format identifiers and uplink and downlink format sequences is stored in the slot format table, and each of the uplink and downlink format sequences comprises uplink and downlink formats of L symbols, where L is a positive integer less than or equal to 14.

* * * * *